US011391410B2

(12) United States Patent
Widgeon

(10) Patent No.: US 11,391,410 B2
(45) Date of Patent: Jul. 19, 2022

(54) CONNECTION BOX SERVICE TRAY

(71) Applicant: KITCO Fiber Optics, Inc., Virginia Beach, VA (US)

(72) Inventor: Lawrence Tyree Widgeon, Virginia Beach, VA (US)

(73) Assignee: KITCO FIBER OPTICS, INC., Virginia Beach, VA (US)

( * ) Notice: Subject to any disclaimer, the term of this patent is extended or adjusted under 35 U.S.C. 154(b) by 0 days.

(21) Appl. No.: 16/897,968

(22) Filed: Jun. 10, 2020

(65) Prior Publication Data
US 2021/0388940 A1 Dec. 16, 2021

(51) Int. Cl.
*F16M 13/02* (2006.01)
*B25H 3/06* (2006.01)
*A47B 23/00* (2006.01)
*F16M 13/00* (2006.01)
*F16M 11/04* (2006.01)
*A47B 77/02* (2006.01)

(52) U.S. Cl.
CPC ........ *F16M 13/005* (2013.01); *F16M 13/022* (2013.01); *A47B 77/022* (2013.01); *B25H 3/06* (2013.01); *F16M 11/041* (2013.01); *F16M 2200/08* (2013.01)

(58) Field of Classification Search
CPC ...... B25H 3/06; F16M 13/022; F16M 11/041; F16M 2200/08; A47B 77/022
See application file for complete search history.

(56) References Cited

U.S. PATENT DOCUMENTS

| 4,119,044 | A | * | 10/1978 | Hines | B25H 1/16 108/27 |
| 4,317,497 | A | * | 3/1982 | Alt | H01M 50/20 180/68.5 |
| D269,868 | S | * | 7/1983 | Seltzer | D13/119 |
| 4,488,497 | A | * | 12/1984 | Bevans | B25H 3/06 108/134 |
| 4,730,760 | A | * | 3/1988 | Keller | B60N 3/007 108/18 |
| 5,312,002 | A | * | 5/1994 | DiCicco | B25H 3/06 211/88.01 |
| 6,138,966 | A | * | 10/2000 | Smith | G11B 33/02 108/43 |
| D692,132 | S | * | 10/2013 | Damron | D24/128 |
| 10,869,976 | B2 | * | 12/2020 | Hoysan | A61G 5/10 |

\* cited by examiner

*Primary Examiner* — Tan Le
(74) *Attorney, Agent, or Firm* — Levenfeld Pearlstein, LLC

(57) ABSTRACT

A service tray for use with, and attachment to, a connection box having a flange having a bolt pattern, includes an L-shaped member defining a work surface and a mounting flange at about a right angles to each other. The work surface has an upper, work surface. The mounting flange has a plurality of openings, at least some of which are aligned with the connection box flange bolt pattern. The L-shaped member has an upwardly oriented lip extending about the edges of the work surface. A portion of at least one of the mounting flange openings has opposing edges configured to receive and secure a threaded bolt. One or more mounting bolts are received in one or more of the mounting flange openings to secure the service tray to the connection box.

8 Claims, 4 Drawing Sheets

CONNECTION BOX SERVICE TRAY

BACKGROUND

The present disclosure relates to a service tray for use with connection boxes such as fiber optic connection boxes. Communication cable connection boxes are used to pull, terminate and maintain cables, such as fiber optic cables. Such connection boxes are prevalent on ships, such as naval vessels, and are referred to as Fiber Optic Interconnection Boxes (FOICB).

Such boxes include an outer flange having a bolt pattern, to which a cover is affixed. Often, these boxes are elevated above the ground so as to comfortably facilitate work inside the box, or they may be strategically located for functional reasons. As such, it will be appreciated that such boxes may be elevated or in locations such work inside the box is difficult.

Work required on the cables in connection boxes often requires splices, such as fusion splices, which requires the use of a fusion splicer. Numerous other tools such as cleavers and the like are also needed to make splices and to perform general maintenance on the cables and equipment. It will be appreciated that the equipment, for example a fusion splicer, must be positioned at a proper elevation for work inside of the connection box.

Interesting and creative, albeit tenuous methods and devices are used to support the needed equipment. For example, it is known to balance a fusion splicer on a nearby piece of equipment, or to balance a splicer on one or a stack of five gallon buckets to elevate the splicer to a proper height for working on the cables. Although such methods and devices work, they do not provide a stable and secure way in which to manage equipment and tools for cable maintenance and splicing.

Accordingly, there is a need for a device to safely and securely support equipment when working in connection boxes. Desirably, such a device is mounted to a connection box at an existing bolt hole pattern and can be used on connection boxes have differing bolt hole patterns. More desirably still, such a device is readily installed on and removed from a connection box.

SUMMARY

A service tray is configured for use with, and attachment to, a connection box. Connection boxes have flanges having a bolt pattern on which a cover is mounted to close off the connection box.

The service tray includes an L-shaped member defining a work surface and a mounting flange at about a right angles to each other. The work surface has an upper or work surface and an upwardly oriented lip extending about first, second and third edges of the work surface. In embodiments, the work surface is a non-slip surface. The non-slip surface can be provided by a resilient, non-slip pad. The non-slip pad can be formed from a fire-resistant material, such as a fire-resistant polypropylene.

The mounting flange has a plurality of openings, at least some of which align with the connection box bolt pattern. The openings can be slotted openings. A portion of one or more of the openings have opposing edges configured to threadedly receive a threaded bolt, so that the unthreaded portion of the shank slides along the slotted opening. The work surface lip can extend upwardly along the mounting flange.

A mounting bolt is received in a or selected ones of the mounting flange openings to secure the service tray to the connection box. In embodiments, the mounting bolt has a head and a shank. An end of the shank includes a thread having a diameter greater than a diameter of the shank between the thread and the head. The thread is configured for threading through the portion of the mounting flange opening configured to receive the threaded bolt. The bolt head can be a hexagonal head. The hexagonal head can have a hexagonal recess.

The tray can be powder coated to prevent corrosion and to provide for an extended service life. The tray can be formed from metal, such as aluminum, such as 5052 aluminum.

Other aspects, objectives and advantages will become more apparent from the following detailed description when taken in conjunction with the accompanying drawings.

BRIEF DESCRIPTION OF THE DRAWINGS

The benefits and advantages of the present embodiments will become more readily apparent to those of ordinary skill in the relevant art after reviewing the following detailed description and accompanying drawings, wherein:

FIGS. 5A-5D are various views of the service tray in which FIG. 5A is a top view, FIG. 5B is a perspective view; FIG. 5C is a rear view; and FIG. 5D is a side view.

DETAILED DESCRIPTION

Figure 1:
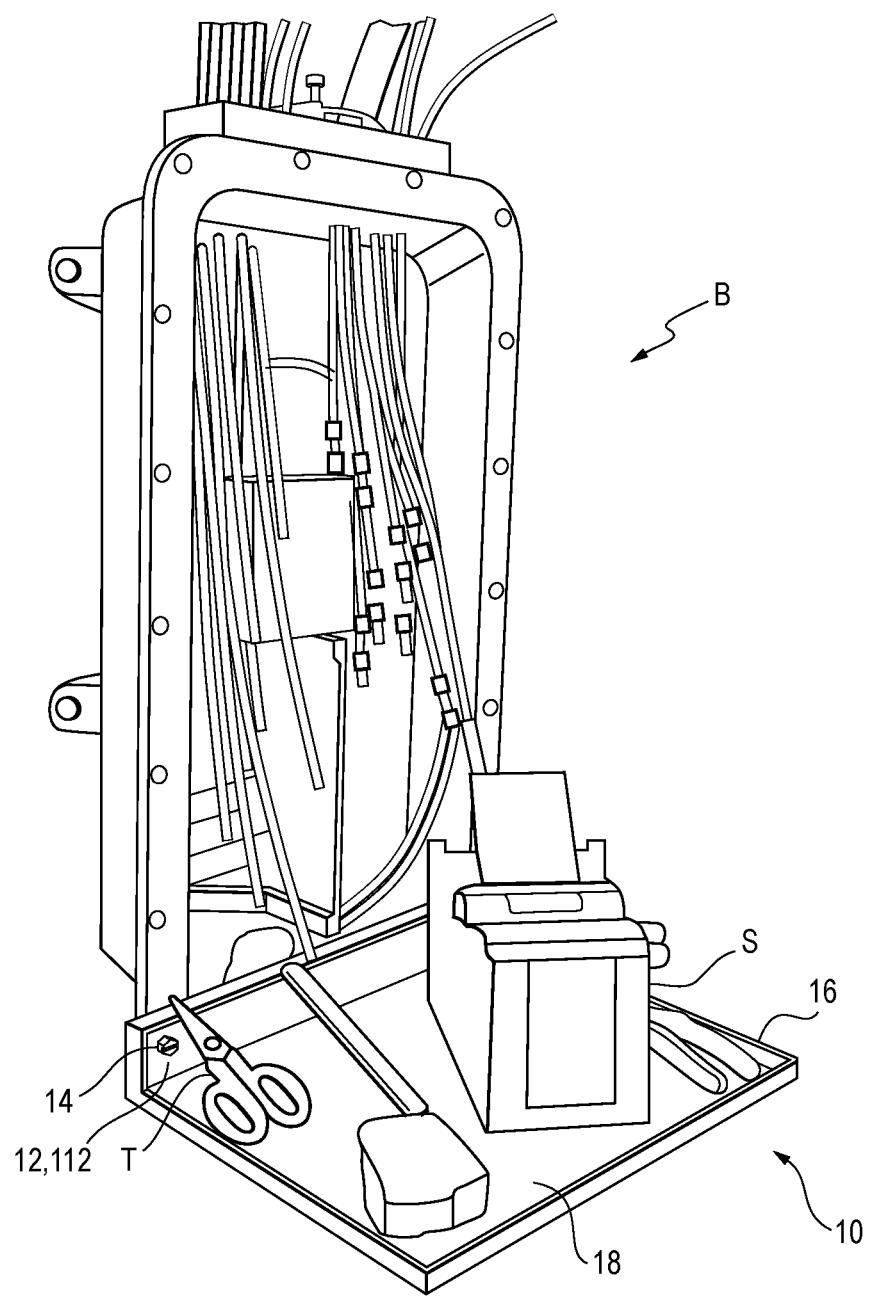
FIG. 1 is a perspective illustration of an embodiment of a connection box service tray shown mounted to a connection box, and illustrated with various devices and tools on the tray.
Figure 2:
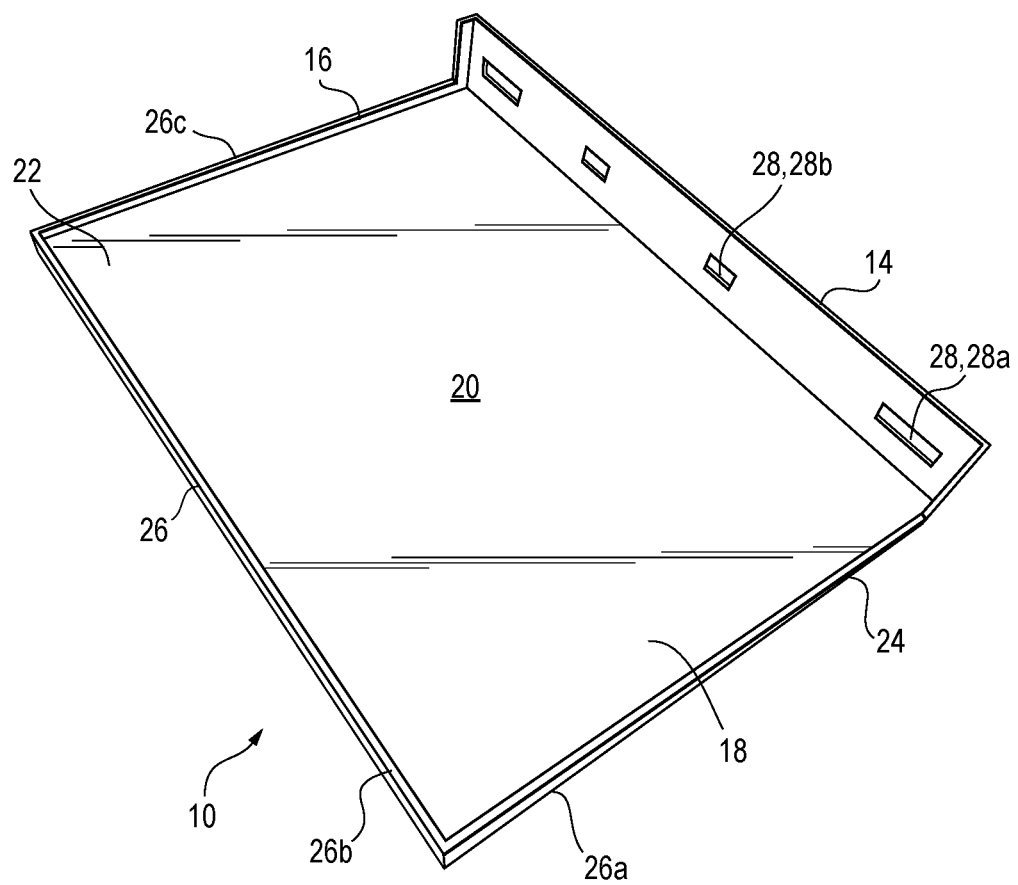
FIG. 2 is a perspective illustration of the service tray.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

FIG. 1 illustrates an embodiment of the connection box service tray 10. The tray 10 is mounted to a connection box B and is shown with an optical cable fusion splicer S and various tools T on the tray 10. The tray 10 is mounted to the connection box B by mounting hardware 12, 112, such as a mounting bolt, one shown in FIG. 1.

The tray 10 is a generally L-shaped member or tray having a short leg 14 and a long leg 16. The short leg 14 is a mounting leg or mounting flange, and is configured to receive one or more mounting bolts 12, 112 best seen in FIGS. 3 and 4A and 4B. The long leg 16 provides a work surface 18 for a user. The mounting flange 14 and work surface 18 are at about a right angle to each other. In embodiments, an upper surface 20 of the work surface tray has a non-slip surface 22. One suitable surface 22 is a mat. The mat 22 can be, for example, a polymeric material such as polypropylene. The mat 22 may be a fire-resistant material, such as a fire-resistant polypropylene (a fine fiber polypropylene). The mat 22 can be adhered to the tray work surface 18 by an adhesive. The adhesive can be pre-applied to the mat 22 such that the mat 22 is an adhesive-backed element.

In embodiments, the tray 10 is coated, for example, powder coated, to prevent chipping or scratching, and to provide a longer service life in harsh environments. In embodiments, the tray 10 is formed from metal, such as aluminum, for example 5052 aluminum. Other suitable materials will be recognized by those skilled in the art.

To provide support for articles (such as fusion splicers S, tools T and the like) on the tray, and to prevent items from falling off of the tray 10, the tray 10 can be formed with a lip 24 surrounding the periphery thereof. In embodiments, the lip 24 surrounds the entire periphery (around first, second and third edges 26a,b,c) including the long leg 16 (work surface 18) and the short leg 14 (mounting flange). Alternately, the lip can surround only the work surface.

The short leg or mounting flange 14 includes a series of openings 28. In embodiments, the openings 28 are slotted openings. In embodiments, the short leg 14 includes four slotted openings 28, and can include outer, longer slotted openings 28a, and inner, shorter slotted openings 28b. The openings 28 are configured and sized to accommodate mounting hardware, such as the bolts 12, 112 illustrated in FIGS. 3 and 4A-4B. The slotted openings 28 are located in the short leg 14 so as to align with most if not all Fiber Optic Interconnection Box (FOICB) flange bolt patterns used on present US naval vessels.

In a current embodiment, the bolts 12, 112 are configured having a thread 30 at an end of a shank 32 and a head 34 at an opposite end of the shank 32. The thread 30 and short leg slotted openings 28 are configured and sized such that the bolt 12, 112 must be threaded through the slot 28. In an embodiment, an end 36 of the slotted opening 28 is threaded (as opposed to the entirety of the slotted opening 28) to threadedly receive the bolt 12, 112. In this manner, once the bolt 12, 112 is threaded beyond the slotted opening thread 30, the bolt 12, 112 at the shank 32, between the thread 30 and the head 34 moves freely along the slotted opening 28. That is, the thread diameter $d_{30}$ is larger than the width was of the slotted opening 28, but the shank diameter $d_{32}$ between the threads 30 and the head 34 is smaller than the thread diameter $d_{30}$. And, the thread diameter $d_{30}$ is such that the bolt 12, 112 can be "threaded" into the slotted opening 28 at the slotted opening thread 38. In this way, once the bolt 12, 112 is threaded into the slotted opening 28, it is captive in the opening 28 (will not fall out), unless it is threaded out of the slotted opening 28. Bolts 12, 112 can be installed in any or all of the openings as desired.

Figure 3:
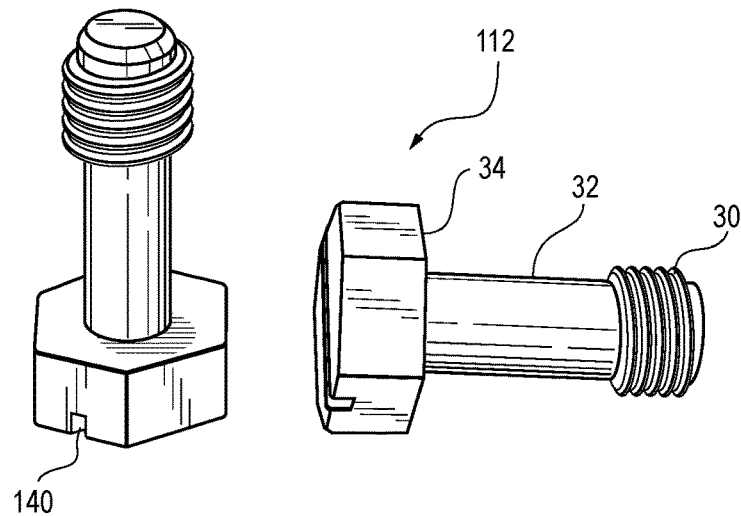
FIG. 3 illustrates an embodiment of mounting hardware for mounting the service tray to the connection box.
Figure 4A:
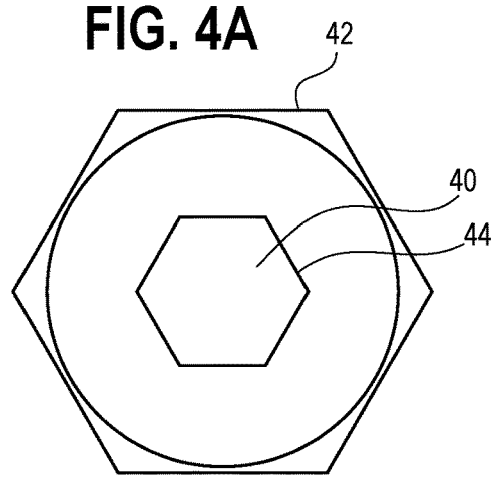
FIGS. 4A and 4B are top and side views of alternate mounting hardware.
Figure 4B:
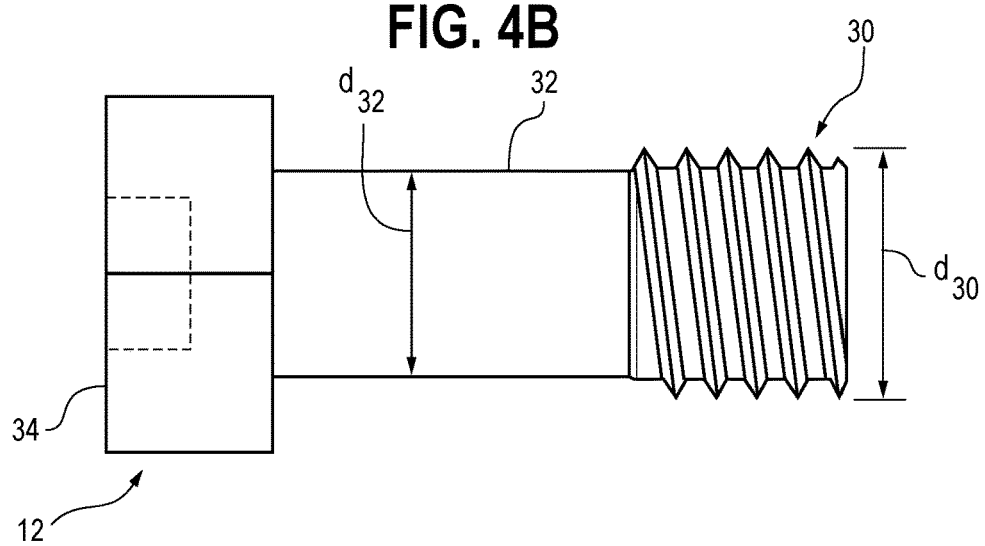
Figure 5A:
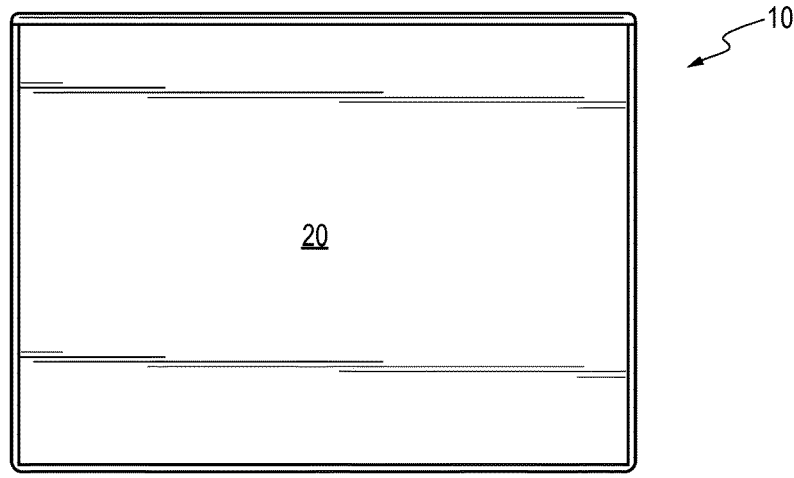
Figure 5B:
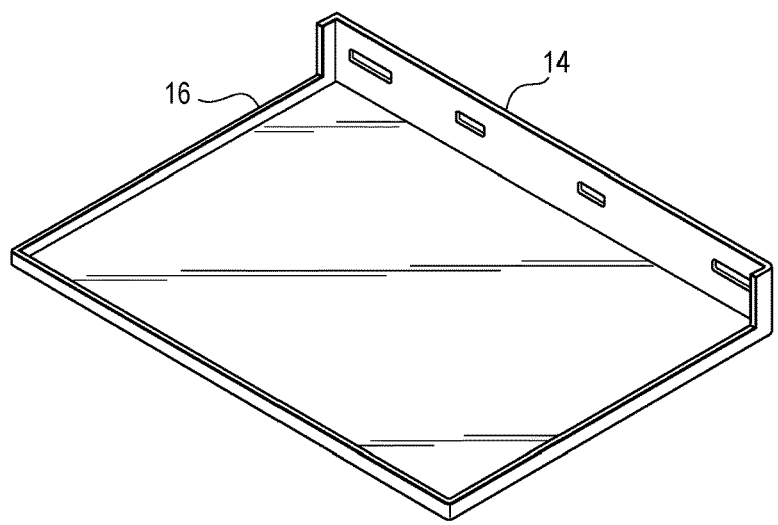
Figure 5C:
Figure 5D:
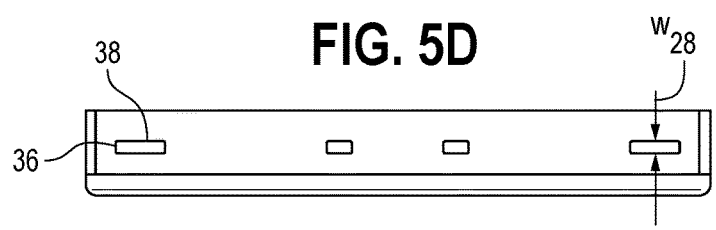

As seen in FIG. 3, the bolts 12, 112 can have hexagonal head 34. In an embodiment, the bolt 12 includes a recess 40 such as the illustrated hexagonal recess in the head 34. In this manner a conventional wrench or socket on the outer head flanks 42 can be used to tighten or loosen the bolt 12, or an allen/hex wrench/key or a wrench on the recess head flanks 44 can be used to tighten or loosen the bolt 12. Alternately, as seen in FIG. 4A,B the bolt head 34 can have hexagonal head 34 (outer flanks 42) and include a slot 140 in the head or any other configuration to allow tightening the bolt 112 to secure the tray 10 or loosening the bolt 112 to remove the tray 10.

In a current embodiment, the service tray 10 is made of 3⁄16", 5052 aluminum alloy, thus providing light weight, but strength sufficient to support equipment, such as a fusion splicer and ancillary tools that may be needed to service cables in a connection box, such as fiber optic cables used aboard naval vessels to, for example, complete the fusion splicing process directly at the FOICB. The tray 10 is powder coated to prevent chipping or scratching, and to provide a more robust structure and a longer service life, such as those that may be encountered in harsh shipboard environments.

In a current embodiment, the work surface 18 is lined with a flame resistant, eight layered, fine-fiber polypropylene, adhesive backed mat 22, to prevent tools and equipment from moving when in use. The work surface 18 is about 16 inches×12 inches to provide sufficient work space, and the mounting flange 14 is a right angle folded 3 inch ledge with strategically located elongated slotted openings 28 to allow the tray 10 to be mounted to the connection box B flange bolt pattern of most FOICBs and most standard enclosures found on, for example, many naval vessels.

In the current embodiment, the one or more slotted openings 28 have a 3⁄8 inch 16 thread 38 at one end 36 to allow the bolt 12, 112 to be threaded with a shoulder of 5⁄16 inch allowing the bolt 12, 112 to be captured and then slide within the slotted opening 28 to match varying connection box B flange bolt patterns and prevent loss of the bolts 12, 112.

In the current embodiment, each tray has a 3⁄8 inch bolt 12, 112 installed in each of the outer elongated slotted openings 28a. The bolts 12, 112 can be, for example, 304 stainless steel and can have threads 30 about 5⁄16 from the end of the shank 32, such that about 9⁄16 inch of the unthreaded portion of the shank 32 has a reduced non-threaded shoulder to allow the bolt 12, 112 to slide back and forth along the slotted opening 28a. This allows the bolt 12, 112 to be aligned with the bolt pattern on the outer flanges of most FOICBs yet remain captured in the elongated slotted opening 28a.

As noted above, the hex head bolt 12 may be tightened or loosened with a conventional 9⁄16 inch ratchet, but with the hex recess 40, it may also be tightened or loosened with a 3⁄16 inch allen wrench interface to allow tightening or loosening in tighter spaces found aboard many vessels. The slotted head bolt 112, can also be tightened or loosened with a conventional 9⁄16 inch ratchet, but can also be tightened or loosened with a conventional flat head screw driver.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as sides, upper, lower, top, bottom, rearward, forward and the like are, where appropriate, for explanatory purposes only and are not intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

What is claimed is:

1. A service tray for use with, and attachment to, a connection box having a flange having a bolt pattern, the service tray, comprising:

an L-shaped member defining a work surface and an upwardly extending mounting flange at about a right angles to each other, the work surface having a flat, planar upper surface, the mounting flange having a plurality of laterally oriented, slotted openings, at least some of the openings being aligned with the connection box bolt pattern, the L-shaped member having an upwardly oriented lip extending fully about first, second and third edges of the work surface and contiguous with the mounting flange, wherein a portion of at least one of the mounting flange openings has opposing edges configured to receive a threaded bolt;

at least one mounting bolt for receipt in a selected one of the plurality of openings in the mounting flange for securing the service tray to the connection box; and a resilient, non-slip, fire-resistant surface on the work surface.

2. The service tray of claim 1, wherein the fire-resistant material is a fire-resistant polypropylene.

3. The service tray of claim 1, wherein the mounting bolt has a head and a shank, wherein an end of the shank includes a thread having a diameter greater than a diameter of the shank between the thread and the head, wherein the thread is configured for threading through the portion of the mounting flange opening configured to receive the threaded bolt.

4. The service tray of claim 3, wherein the head is a hexagonal head.

5. The service tray of claim 4, wherein the hexagonal head has a hexagonal recess.

6. The service tray of claim 1, further including a powder coating on the service tray.

7. The service tray of claim 1, wherein the service tray is formed from aluminum.

8. The service tray of claim 7, wherein the aluminum is 5052 aluminum.

* * * * *